Aug. 22, 1933. B. STOCKFLETH 1,923,514
LOW LIMIT BEARING AND METHOD OF MAKING SAME
Filed April 10, 1930 2 Sheets-Sheet 2
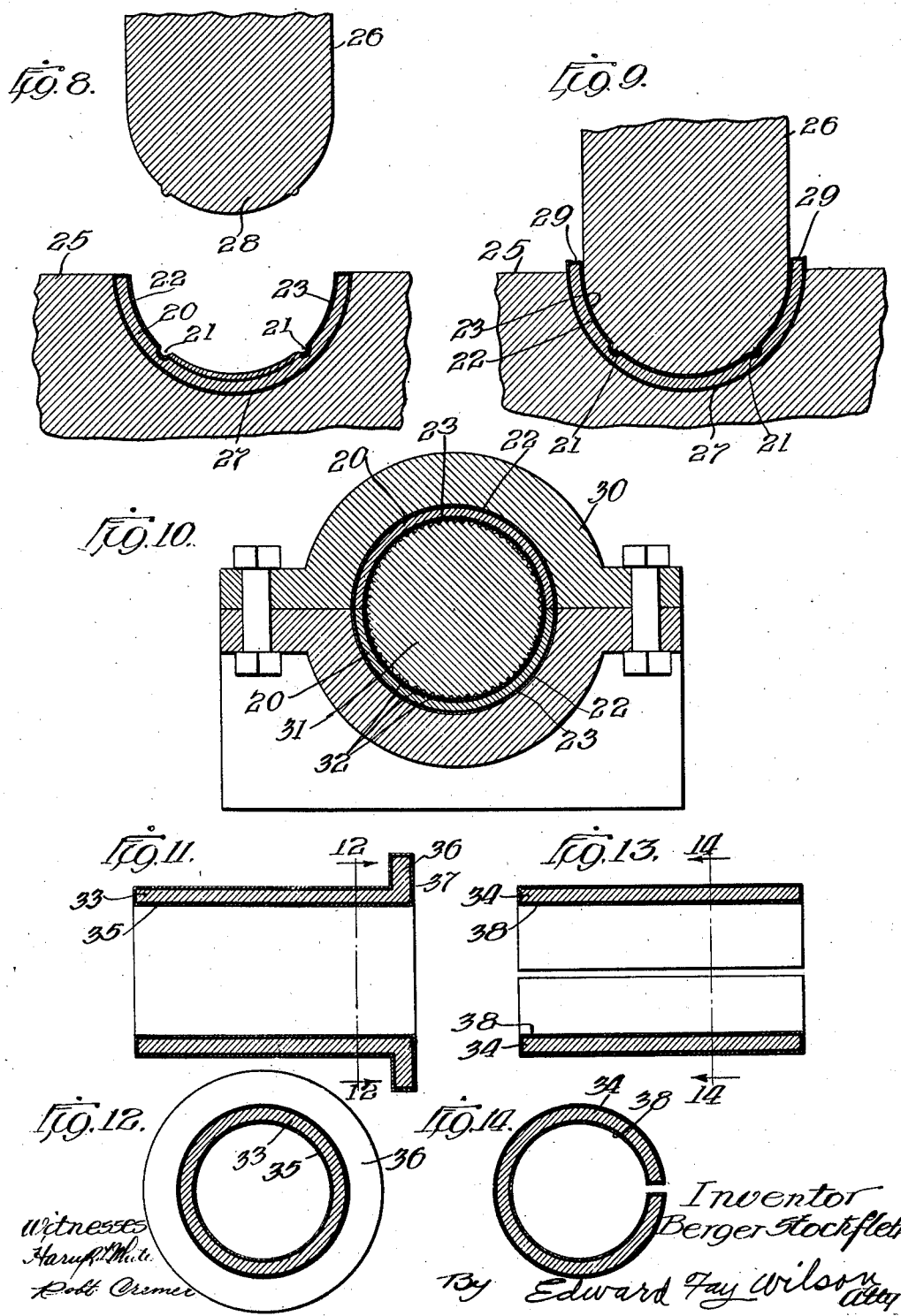

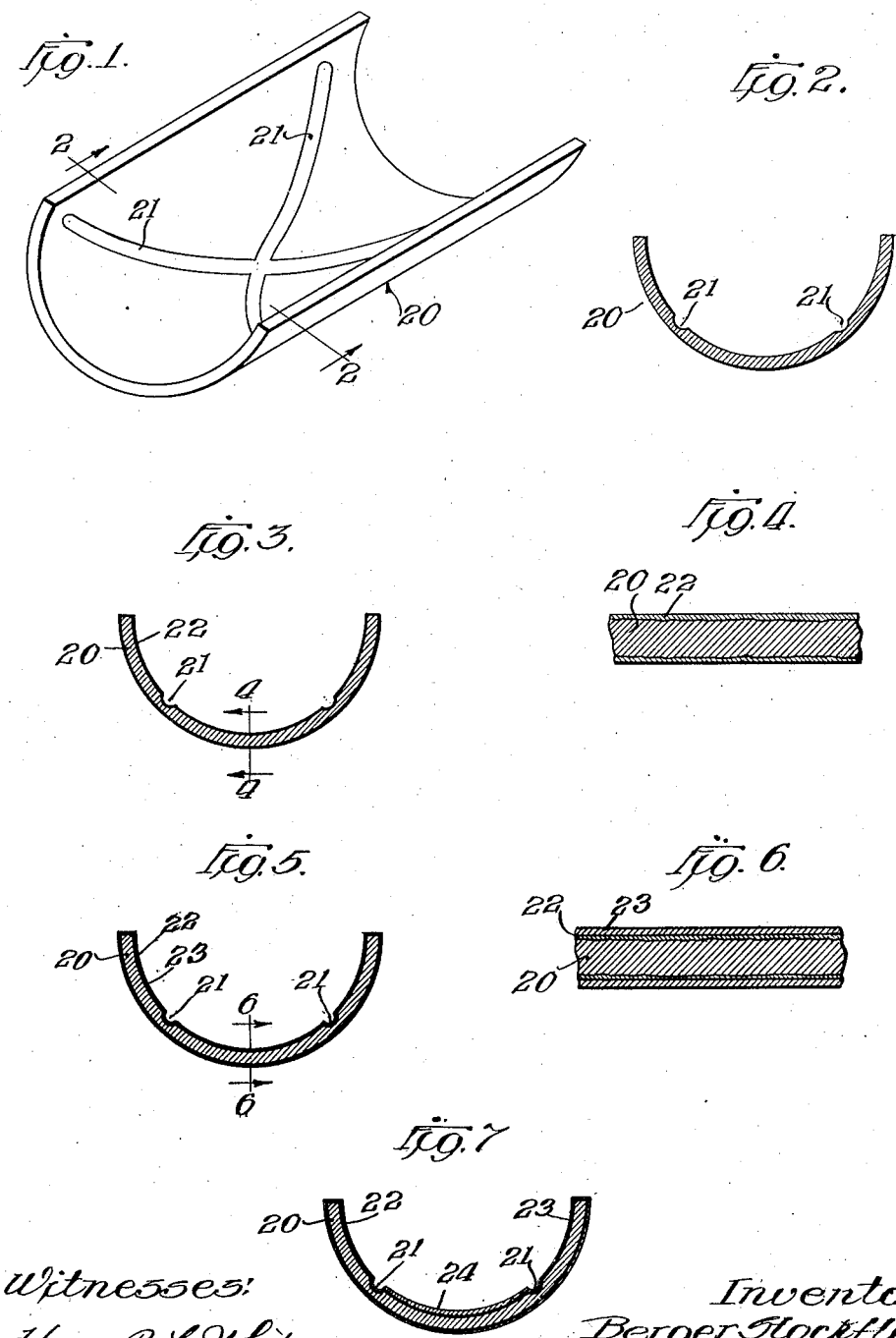

Patented Aug. 22, 1933

1,923,514

UNITED STATES PATENT OFFICE 1,923,514

LOW LIMIT BEARING AND METHOD OF MAKING SAME

Berger Stockfleth, Niles, Mich., assignor, by mesne assignments, to The Cleveland Graphite Bronze Company, Cleveland, Ohio, a Corporation of Ohio Application April 10, 1930. Serial No. 443,103

23 Claims. (Cl. 29—149.5)

This invention relates to improvements in renewable bearing sleeves for use especially in high speed bearings, such as the bearings for high speed engine shafts. Usually bearing sleeves of this kind are made in half-cylindrical form. The sleeve bearings are ordinarily about one-eighth of an inch in radial thickness. It is common practice to make use of a suitable bearing metal, such as Babbitt metal, for the inner surface, which contacts with the shaft mounted in the bearing, and a harder, tougher or cheaper metal, such as steel, brass or bronze, for the back of the sleeve.

Heretofore it has been common practice to make the inner lining of appreciable thickness, especially when steel is used for the backing or shell of the sleeve, the bearing metal constituting approximately one-sixth to one-half of the radial thickness of the sleeve.

This present invention relates to a bearing sleeve of this character, which shall be capable of being cheaply furnished to exact dimensions, complete with oil grooves, etc., and yet have a very inappreciable thickness of bearing metal, in fact, what may be aptly termed but a film; which sleeve shall consist chiefly of a relatively cheap metal, such as steel, and yet have sufficient of the more expensive bearing metal for all practicable purposes; and which shall lend itself to the pressure method of forming and finishing.

The object of this invention is to provide a bearing sleeve of the character mentioned, which shall cost less to produce, both in material and labor; which shall have a greater practical coefficient of heat conductivity to the end that the bearing shall run cooler; in which the film of bearing metal shall be so thin that there is practically no possibility of the bearing metal flowing under the most severe practical operating conditions; in which the material of the back shall be brought so close to the shaft that the characteristics of the sleeve as related to heat conductivity, hardness, and resistance to flow, are practically those of the backing rather than those of the bearing metal.

To meet the exacting requirements of modern practice in renewable or replaceable parts, particularly bearing sleeves, it is necessary to hold the allowable tolerances to a very low limit, viz. between a quarter and half of one thousandth of an inch.

This present invention contemplates the production of the back or shell of the sleeve to accurately finished and sized dimensions and with the necessary oil grooves and cellars formed therein. Then the application of the babbitt, tin or other suitable bearing metal, as an extremely thin coating on the inner surface of the shell and bonded thereto, the compression of this lining and accurate sizing of the sleeve by the pressure method and possibly the use of beaded broach which rubs and burnishes the bearing metal, but does not remove any.

When the dipping of the accurately formed and sized back or shell is done carefully so as to avoid any excresences or lumps, the sleeve is ready for some applications or uses without any further finishing, in other words, for some uses the final pressure sizing step may be omitted.

There are several features of importance inherent in a bearing thus constituted and produced. One of these is that such a bearing, having an almost uniform constituency from its inner surface to its outer surface and a minimum of bearing metal, is much higher in heat conductivity and, consequently, the bearing runs cooler. Further, the bearing metal being so relatively thin and applied hot in such a thin layer is not only bonded to the metal of the back, but actually enters into the pores of the back metal, thus adding to the heat conductivity of the sleeve as a whole and, in a sense, increasing the effective thickness of the lining.

One method of producing bearings of the kind contemplated includes, after the formation of the backing shell, the following steps when applying tin as the bearing metal.

After the backing shell is formed, and depressions such as oil grooves, etc., are produced therein, it is thoroughly cleaned, then it is dipped in suitable flux, then into molten tin at a temperature of about 700 to 900 degrees Fahrenheit. This high temperature causes the tin to bond effectively with the steel, and even causes the tin to enter into the pores of the steel, thus most effectively to bond to the back. The sleeve is then again dipped in a molten bath of tin, but at a lower temperature, preferably just above the melting point of the tin, which is so close to the crystalizing temperature that the tin adheres and does not flow off freely as in the first dipping step. Another feature of this second dipping step is that the low temperature prevents oxidization of the surface and, consequently, the sleeve presents a very desirable appearance when finished. Consequently this second dipping causes the tin to cover the shell and remain on same, producing a depth or thickness of about .0005 to .001. Preferably, the shell is removed from the tin bath in a horizontal position and the longitudinal edges up, and this causes some of the tin to settle down in the bottom of the half-cylindrical shell, producing a thickness at the bottom of .002 to .010, which, under some conditions, is an advantage.

After the shell is thus coated with the bearing metal, viz., in this instance, tin, it is formed, sized and finished in dies under very heavy pressure.

While the above method of producing such bearing sleeves is preferred, the invention is not limited to such method, for the reason that many of the desirable advantages are inherent in bearing sleeves, either half-cylindrical or full cylindrical, in which the bearing metal constitutes but a thin film on the backing metal.

The reason for this is that the more the film of bearing metal is reduced in thickness, while yet remaining as a complete and unbroken coating, the more the desirable characteristics of the backing metal come into play and are effective in the use of the sleeve.

In the method of production described, the film of bearing metal is so thin that the accurate forming and sizing of the backing blank before the application of the bearing metal is necessary.

Preferably, I form and size the backing by the pressure method in suitable dies to bring the back within the allowable tolerances of the finished sleeve as to form and dimensions. Then, when the thin film of the bearing metal is applied as described, it is of substantially uniform thickness and the sleeve is slightly thicker than the finished sleeve, such thickness being reduced and the uniformity of thickness of film preserved by the pressure method of forming and sizing.

It is conceivable that the rough blank, particularly when the invention is applied to the production of a full cylindrical bearing sleeve, could be accomplished by other than the pressure method, but the advantages of the extremely thin film of the bearing metal would be preserved.

The invention will be more readily understood by reference to the accompanying drawings forming part of the specification and in which:—

Fig. 1 is a perspective view of a preformed back.

Fig. 2 is a transverse section on the line 2—2 of Fig. 1.

Fig. 3 is a sectional view similar to Fig. 2 but illustrating the condition after the first dip.

Fig. 4 is an enlarged section on the line 4—4 of Fig. 3.

Fig. 5 is a section similar to Fig. 3 but illustrating the condition after the second dip.

Fig. 6 is an enlarged section similar to Fig. 4 and taken on the line 6—6 of Fig. 5.

Fig. 7 is a section similar to Fig. 5 but illustrating a slight modification.

Fig. 8 is a diagrammatic, sectional view of a press illustrating the method of finishing the bearing shell.

Fig. 9 is a view similar to Fig. 8 illustrating the completion of the pressing operation.

Fig. 10 is a sectional view illustrating one method of finishing the interior of the sleeves.

Fig. 11 is a longitudinal sectional view of a solid bearing sleeve illustrating one form of the invention.

Fig. 12 is a transverse section on the line 12—12 of Fig. 11.

Fig. 13 is a view similar to Fig. 11 but showing a split cylindrical sleeve; and Fig. 14 is a transverse section on the line 14—14 of Fig. 13.

In the drawings 20 illustrates a back preferably formed up out of sheet metal and preferably a relatively hard, stiff and cheap metal, such as steel, but it should be understood that the invention is not limited to steel.

The back 20 is formed up with suitable oil grooves 21 on its inner side, as may be required.

The back 20 shown is made in half-cylindrical form and is formed and sized at this stage of the method preferably within the allowable tolerance of the finished sleeve, that is, within .00025 of an inch of the required dimensions both as to overall dimensions and thickness.

This back would practically fit perfectly in place for operation but the shaft which runs in such a sleeve must be protected against direct contact with the metal of the back.

For this protection, I coat the back with an extremely thin layer of suitable bearing metal, such as tin, Babbitt metal or other suitable metal, which is capable of being applied to the back in an extremely thin and uniform layer especially over the interior surface.

The method which has been found to be satisfactory for applying the bearing metal and which is illustrated in the drawing consists preferably in first dipping the back in molten bearing metal of a character to bond to the back, the bearing metal being maintained at a relatively high temperature, such, for instance, as approximately between 700 and 900 degrees Fahrenheit.

Before immersing the back in this relatively hot bonding bearing metal, it is thoroughly cleaned by some suitable method, such as immersing it or washing it in suitable acid to remove all scale, oil, etc., and cause the back to present a perfectly clean metallic surface throughout.

When such a piece of metal is immersed in such relatively hot bonding metal, the bonding metal forms an extremely thin coating on the back and penetrates into the microscopic pores of the metal of the back, thus effecting a most thorough and complete bond with the back.

The coating, illustrated at 22, resulting from this first dip of the back is very thin, being probably less than .0001 of an inch thick, but it is complete and uniform over the entire surface. While such an extremely thin layer of the bonding metal might, under some circumstances, be sufficient to protect the shaft from contact with the metal of the back, I prefer for most uses to make the bearing metal thicker and yet keep it so thin that it may aptly be termed a film of the bearing metal on the back.

The next step in the process adds a layer 23 of suitable bearing metal to the shell somewhat thicker than the first coating. This is accomplished by dipping the coated shell in molten bearing metal maintained at a temperature only slightly above the melting point of such metal or, in other words, slightly hotter than the point of crystallization of the metal. This causes the bearing metal, such as tin, Babbitt metal, or other suitable bearing metal, to form a coating which, as compared to the first coating, is relatively thick, but even so is usually not more than .01 of an inch thick but may be as thin as .002 of an inch thick. But, even so, this second layer is practically uniform all over the shell and is within the allowable tolerances of the finished bearing.

At this point in the process, the bearing is slightly thicker than is required and the next step illustrated in Figs. 8 and 9 reduces the thickness by pressure to that required, thus completing and finishing the bearing as to form and dimensions. It should, of course, be understood that the relative thickness of the back and the lining are all out of proportion in the drawings for the reason that the coatings are so thin it would be impossible to show them in their true relation.

The pressure finishing step is illustrated in Figs. 7 and 8. For this purpose, I provide two die members 25 and 26. The die block 25 has a die groove 27 which is accurately formed within the allowable tolerances to the exact form and dimensions of the outer surface of the finished sleeve. The punch member 26 has its lower co-operating end 28 formed and sized accurately to the form and dimensions of the inner side of the sleeve. The coated sleeve is placed in the lower die and then the punch is forced down with a heavy pressure sufficient to force the metal of the sleeve to be extruded to some extent at the longitudinal edges of the sleeve, as shown at 29.

In this process, the sleeve is completed and for most uses does not require any further work except to remove the extruded edges 29.

The back 20 varies from about one-eighth of an inch to three-sixteenths of an inch thick, and the total thickness of the two coatings is preferably not more than about .00025 of an inch to .0005 of an inch. Consequently, the back, which varies from .125 to .1875 of an inch, is approximately 300 to 400 times as thick as the coating, in other words, constituting about 99% of the thickness, the coating constituting about 1% of the thickness.

As the heat conductivity of steel or other suitable metal for the back is very considerably higher than that of the bearing metal, such reduction of thickness of the bearing metal adds considerably to the heat conductivity of the bearing sleeve and, consequently, the bearing will run cooler at the same speed or can be safely run at much higher speeds. Again, as the bearing metal costs more than the metal of the back, such extremely thin coatings of the bearing metal reduces the cost of material very considerably.

To meet some conditions of use, it is desirable to provide an additional thickness of the bearing metal at the bottom of the half-shell, as shown at 24, Fig. 7. This is accomplished by lifting the back out of the low temperature, dipping in a horizontal position, and retaining it in such position until the bearing metal has solidified.

The finishing of such a bearing sleeve is accomplished as before in a suitable press and the results are practically the same as already described, except that the bearing metal is slightly thicker in the finished bearing than at the sides.

In some instances, and for some purposes, it is desirable to burnish or rub down the inner surfaces of the half-sleeves and Fig. 10 illustrates this step. A pair of the half-bearing sleeves are clamped in a housing 30 and a beaded reamer 31 is run through the bearing. The rounded projections 32 on the surface of the reamer do not remove any of the bearing metal but merely rub or burnish the same, and by this means the inner diameter of the bearings can be readily brought within a limit of .0001 or less of the required size.

The invention may also reside in complete cylindrical bearing sleeves such, for instance, as is shown at 33, Fig. 11, or 34, Fig. 13.

The sleeve shown at 33 is a complete cylindrical sleeve and consists of a sleeve body made of the cheaper metal and an inner wearing surface 35, which consists of an extremely thin film of the bearing metal bonded to and upon the sleeve. The solid sleeve 33 may or may not have a circumferential flange 36 at one end, but if it does, the outer wearing surface 37 of the flange is likewise covered with a thin film of the bearing metal, in accordance with this invention.

The split sleeve 34, shown in Figs. 13 and 14, likewise has a body of the cheaper, harder metal and has an extremely thin film 38 of the bearing metal bonded to and upon the inner surface of the sleeve.

It will now be clear that in whatever form of bearing the invention is embodied, the novel and useful features inhere, that is, the reduction in cost, the increase in heat conductivity, and the uniform thickness of the film of bearing metal which protects the shaft from contact with the back.

Another valuable feature resides in the fact that even if the thin inner film of bearing metal should melt out on account of lack of oil or for any other reason, the clearance or looseness thus produced between the shaft and the steel back is so slight as not to result in any serious damage until the sleeve can be replaced.

One feature which assists is that as the film of bearing metal is reduced in thickness, a point is reached where the film cannot be reduced in thickness any further without an increase in pressure far beyond any practical possibility. In other words, the bearing metal film may be likened to an oil film which, as is well known, can be reduced from an ordinary working thickness to a certain limit by increase in load but a point is reached finally where it cannot be further reduced in thickness without an excessively large increase in load beyond practical limits at which point it will be disrupted.

In like manner, the thin bearing metal films may be reduced in thickness but a point is finally reached, due probably to the points of bonding of the bearing metal to the steel back being practically within the thickness of the thin film that the bearing metal film cannot be further reduced in thickness without an excessively large overload or an excessive production of heat.

It is impossible to attain any such result with a bearing lining of ordinary or reduced thickness unless the thickness is reduced as described herein to a mere film of almost no thickness.

The bearing metal lining on the inner surface is so thin that its effect on the heat conductivity of the bearing sleeve is practically nil. In other words, the resistance to heat flow through this extremely thin film is so slight that the temperature at the line of bonding is higher than it would be if the bearing metal lining were of the usual thickness.

The temperature at the bonded line is practically that of the journal itself and, consequently, we have a greater difference of temperature between the inner and outer surfaces of the backing metal which results in a more rapid flow of heat away from the journal and a greater transfer or flow of heat through the steel back. This is of great benefit as it results in a cooler running bearing.

Another way of expressing this idea is that the characteristic of the back, so far as heat conductivity is concerned, is that of the metal of the back unaffected to any practical extent by the bearing metal constituting the inner wearing surface.

Nevertheless, even in such an extremely thin film of the bearing metal, all of the desirable characteristics of such metal are preserved if not enhanced.

As many modifications of the invention will readily suggest themselves to one skilled in the art, I do not limit or confine the invention to the specific sequence of specific steps, nor to the specific construction herein described and illustrated, except within the scope of the appended claims.

I claim:

1. A bearing sleeve of the kind described, comprising a main body or shell of a cheaper metal, such as steel, provided with suitable oil grooves or cellars formed on the inner side thereof and a film-like coating of bearing metal on the inner surface of the shell applied thereon in melted condition, the whole formed and sized by pressure in suitable dies.

2. A bearing sleeve of the kind described, comprising a main body or shell of half-cylindrical form, and formed of a relatively low cost metal, such as steel, and provided with suitable oil grooves on its inner surface, and an extremely thin film-like coating of bearing metal formed on the inner surface thereof from molten metal and bonded thereto, the whole accurately formed and sized by pressure applied by means of suitable dies.

3. The herein described method of making half-cylindrical bearing sleeves, which consists in first producing a backing shell of a cheaper metal, such as steel, of a thickness slightly greater than in the finished sleeve, forming the same with suitable oil grooves on its inner side, coating at least the inner surface with a suitable bearing metal film-like thickness, and sizing and finishing the shell by pressure applied thereto in suitable dies.

4. The herein described method of making half-cylindrical bearing sleeves, which consists in first producing a backing shell of a cheaper metal, such as steel, of a thickness substantially within the allowable limits of the finished sleeve, forming the same with suitable oil grooves on its inner side, coating at least the inner surface with a suitable bearing metal applied in molten condition, the coating being of film-like thickness, and sizing and finishing the shell in suitable dies and completing the inner surface by means of a beaded broach and without cutting away any of the thickness of the bearing metal.

5. A bearing sleeve of the kind described, having a backing of relatively harder, stiffer and cheaper metal, such as steel, and comprising approximately about 99% of the thickness of the sleeve, and a lining of suitable bearing metal applied to the back in molten condition and bonded to the back and comprising not more than 5% of the thickness of the sleeve, and whereby the desirable characteristics of the sleeve as to heat conductivity are those of the backing metal rather than those of the bearing metal.

6. In the herein described novel method of making bearing sleeves, the steps consisting of first producing a backing shell of harder relatively cheaper metal such as steel, preformed as to dimensions and shape substantially within the allowable limits of the finished sleeve, immersing the preformed shell in a suitable molten bonding metal, maintained at a temperature of approximately between 700 and 900 degrees Fahrenheit to coat the shell with such metal, and later immersing it in a bath of suitable bearing metal, maintained at a temperature slightly above the melting point of such bonding metal and pressing the coated sleeve while hot in suitable dies to size and finish same as to inner and outer dimensions.

7. In the herein described novel method of making bearing sleeves, the steps consisting of first immersing a backing shell of steel, or similar metal preformed to dimensions approximately the same as the finished sleeve, in a suitable molten bonding metal, maintained at a temperature of approximately between 700 and 900 degrees Fahrenheit to coat the shell with such metal, and then the immersing of the shell in a bath of suitable bearing metal, maintained at a temperature slightly above the melting point of such bonding metal and removing the shell from the latter bath in horizontal position and with the concave side up and allowing it to cool in such position, whereby the bearing metal is thicker along the longitudinal center line of the bearing than at its edges.

8. A bearing sleeve of the character described and comprising a back of a harder, stiffer and cheaper metal, such as steel, and an inner coating of suitable bearing metal applied to the backing in molten condition and bonded to the backing, the bearing metal being reduced in thickness by pressure to the point where there is practically no bearing metal which is free of bond with the back.

9. A bearing sleeve of the character described and comprising a back of a harder, stiffer and cheaper metal, such as steel, and an inner film of suitable bearing metal applied to the back in molten condition and bonded to the back, the film being so thin that practically the whole thickness thereof is directly bonded to the back.

10. An accurately finished bearing sleeve of the kind described and comprising a back shell of relatively harder, stiffer and cheaper metal, such as steel, and an inner film of suitable bearing metal applied to the back in molten condition and bonded to the back, the inner surface of the bearing metal being accurately finished to suitable dimensions by pressure and the film being but a few thousandths of an inch in thickness.

11. An accurately finished bearing sleeve of the kind described and comprising a back shell of relatively harder, stiffer and cheaper metal, such as steel, and an inner film of suitable bearing metal bonded to the back by dipping the back in molten metal, the inner surface of the bearing metal being accurately finished to suitable dimensions by pressure applied in suitable dies and the film being not more than five thousandths of an inch in thickness.

12. An accurately finished bearing sleeve of the kind described and comprising a back shell of relatively harder, stiffer and cheaper metal, such as steel, and an inner film of suitable bearing metal applied to and bonded to the back by immersing the back in molten metal, the film being of substantially uniform thickness throughout and but a few thousandths thick.

13. A bearing sleeve of the kind described, in which the bearing metal lining is so thin that for all practical purposes the bearing metal does not extend beyond the zone of bonding between the bearing metal and the back.

14. A bearing metal sleeve of the kind described, in which the bearing metal lining is reduced in thickness until it barely covers the bonding points between the lining and the back.

15. A bearing metal sleeve of the kind described, in which a bearing metal lining is bonded to the back by means of a metal capable of such bonding effect, the lining being of such thinness so as to barely cover the bonding points.

16. In a bearing sleeve of the kind described, and having a film-like lining of bearing metal bonded to the back, the film being so thin that it cannot flow under pressure to which it is subjected in use.

17. The herein described method of making a composit bearing sleeve, which consists in pressing a substantially half-cylindrical backing shell accurately to the dimensions and farm of the finished sleeve within a very small tolerance and dipping the shell thus formed in bearing metal to apply a very thin film-like coating of the bearing metal thereon and whereby the film-like coating is bonded to the backing shell.

18. The herein described method of making a composit bearing sleeve, which consists in subjecting a preformed backing shell to a heavy forming pressure in suitable dies thereby forming the shell accurately within a very small tolerance to the form and dimensions of the desired finished sleeve including such oil grooves or cellars as may be desired and then applying a very thin film-like coating of bearing metal thereon by immersing the formed shell in molten metal.

19. The improved bearing sleeve herein described and consisting of an accurately preformed backing shell of relatively cheap and hard metal, such as steel, the dimensions of the shell being a small fraction of a thousandth of an inch less than the required finished dimensions, and a very thin film-like coating of bearing metal on the shell applied thereto in molten condition.

20. The method as defined in claim 17, and in which the sleeve is finished to desired dimensions by subjecting it to pressure in suitable dies.

21. The method as defined in claim 17, and in which the inner radius is enlarged by forcing the bearing metal outwardly without enlarging the outer diameter of the sleeve.

22. The method as defined in claim 18, and in which the sleeve is finished to desired dimensions by subjecting it to pressure in suitable dies.

23. The method as defined in claim 18, and in which the inner radius is enlarged by forcing the bearing metal outwardly without enlarging the outer diameter of the sleeve.

BERGER STOCKFLETH.